(12) United States Patent
Enyo et al.

(10) Patent No.: US 11,762,139 B2
(45) Date of Patent: Sep. 19, 2023

(54) ULTRAVIOLET RAY TRANSMISSIVE FILTER AND METHOD FOR PRODUCING SAME

(71) Applicant: Optical Coatings Japan, Gotemba (JP)

(72) Inventors: Tomonori Enyo, Gotemba (JP); Hiroto Ito, Gotemba (JP); Daiki Sano, Gotemba (JP)

(73) Assignee: OPTICAL COATINGS JAPAN, Gotemba (JP)

( * ) Notice: Subject to any disclaimer, the term of this patent is extended or adjusted under 35 U.S.C. 154(b) by 273 days.

(21) Appl. No.: 17/365,181

(22) Filed: Jul. 1, 2021

(65) Prior Publication Data

US 2022/0043196 A1 Feb. 10, 2022

(30) Foreign Application Priority Data

Aug. 7, 2020 (JP) ................. 2020-135102

(51) Int. Cl.
*G02B 5/28* (2006.01)

(52) U.S. Cl.
CPC ............. *G02B 5/283* (2013.01); *G02B 5/285* (2013.01)

(58) Field of Classification Search
CPC .......... G02B 5/283; G02B 5/285; G02B 1/10; G02B 1/11; G02B 1/113; G02B 1/115; G02B 5/20; G02B 5/28; B29C 71/02; B29C 2071/022; B29C 2071/025; B29C 2071/027
USPC ....... 359/359, 350, 361, 577, 580, 582, 581, 359/586, 588, 589, 590; 264/232, 234, 264/235, 340, 345, 346
See application file for complete search history.

(56) References Cited

U.S. PATENT DOCUMENTS 7,037,595 B1 * 5/2006 Andre .................... G02B 5/285
359/359

FOREIGN PATENT DOCUMENTS

| JP | 06188500 A | * | 7/1994 | |
| JP | 2006-163046 A | | 6/2006 | |
| WO | WO-0029330 A1 | * | 5/2000 | ............ C01G 27/02 |

* cited by examiner

*Primary Examiner* — Arnel C Lavarias
(74) *Attorney, Agent, or Firm* — WHDA, LLP

(57) ABSTRACT

Provide is an ultraviolet ray transmissive filter in which a crystal structure of a hafnium oxide layer is controlled to improve the light resistance of an optical interference film, and which can suppress reduction of the transmissivity in a transmission band even under long-term irradiation with ultraviolet rays. The optical interference film includes the hafnium oxide layer, and in the crystal structure of the hafnium oxide layer, spectral peak intensities from X-ray diffraction which are derived from the orthorhombic crystal structure and a tetragonal crystal structure are lower than a spectral peak intensity from X-ray diffraction which is derived from the monoclinic crystal structure.

5 Claims, 3 Drawing Sheets

ULTRAVIOLET RAY TRANSMISSIVE FILTER AND METHOD FOR PRODUCING SAME

BACKGROUND OF THE INVENTION

1. Field of the Invention

The present invention relates to an ultraviolet ray transmissive filter having a multilayer optical interference film in which layers having different refractive indexes are alternately laminated, and to a method for producing the same.

2. Description of the Related Art

Generally, ultraviolet ray transmissive filters are commonly used in light emitting devices, imaging devices, measuring devices, communication devices, etc., for selectively blocking or transmitting an ultraviolet ray in a predetermined wavelength band according to uses and functions of the devices.

As the ultraviolet ray transmissive filter, a filter configured to have a multilayer optical interference film, in which layers having different refractive indexes are alternately laminated onto a substrate, is known.

As the optical interference film forming the ultraviolet ray transmissive filter, a film including at least a hafnium oxide layer is publicly known. (For example, see Japanese Patent Application Publication No. 2006-163046).

SUMMARY OF THE INVENTION

The optical interference film including a hafnium oxide layer is suitable as an optical interference film of an ultraviolet ray transmissive filter of alight source, etc., which selectively transmits an ultraviolet ray of a specific wavelength, because of favorable transmissive properties in a transmission wavelength range (e.g., the wavelength range of 220 to 270 nm) and favorable light blocking properties in a blocking wavelength range (e.g., the wavelength range of 300 to 400 nm).

However, long-term irradiation with ultraviolet rays results in deterioration of the transmissivity in a transmission band of the optical interference film, which is problematic.

The present invention solves the foregoing problem and it is an object of the present invention to provide an ultraviolet ray transmissive filter in which a crystal structure of a hafnium oxide layer is controlled to improve the light resistance of an optical interference film, and which can suppress reduction of the transmissivity in a transmission band even under long-term irradiation with ultraviolet rays.

An ultraviolet ray transmissive filter according to the present invention is an ultraviolet ray transmissive filter having a multilayer optical interference film in which layers having different refractive indexes are alternately laminated, wherein the optical interference film includes at least a hafnium oxide layer, and in a crystal structure of the hafnium oxide layer, spectral peak intensities from X-ray diffraction which are derived from an orthorhombic crystal structure and a tetragonal crystal structure are lower than a spectral peak intensity from X-ray diffraction which is derived from a monoclinic crystal structure, whereby the foregoing problem is solved.

A method for producing an ultraviolet ray transmissive filter according to the present invention is a method for producing an ultraviolet ray transmissive filter having a multilayer optical interference film in which layers having different refractive indexes are alternately laminated, wherein the optical interference film includes at least a hafnium oxide layer, the method including: controlling a crystal structure of the hafnium oxide layer by annealing treatment by electromagnetism or heat treatment, whereby the foregoing problem is solved.

According to the ultraviolet ray transmissive filter, the spectral peak intensities from X-ray diffraction which are derived from the orthorhombic crystal structure and the tetragonal crystal structure of the hafnium oxide layer are lower than the spectral peak intensity from X-ray diffraction which is derived from the monoclinic crystal structure thereof, which makes it possible to improve light resistance to ultraviolet rays and suppress reduction of the transmissivity in a transmission band of the optical interference film even under long-term irradiation with ultraviolet rays as favorable transmissive properties in a transmission wavelength range of the optical interference film including the hafnium oxide layer and favorable light blocking properties in a blocking wavelength range thereof are maintained.

The structures of the present application make it possible to further improve light resistance to ultraviolet rays.

According to the method for producing an ultraviolet ray transmissive filter, the crystal structure of the hafnium oxide layer is controlled by annealing treatment by heat treatment or electromagnetism, which makes it possible to easily produce an ultraviolet ray transmissive filter that is capable of improving the light resistance of the optical interference film to ultraviolet rays and suppressing reduction of the transmissivity in a transmission band of the optical interference film even under long-term irradiation with ultraviolet rays as good transmissive properties in a transmission wavelength range of the hafnium oxide layer and good light blocking properties in a blocking wavelength range thereof are maintained.

The structure of the present application makes it possible to easily produce the optical interference film.

The structures of the present application result in further improvement of the light resistance of the ultraviolet ray transmissive filter to be produced.

DESCRIPTION OF THE PREFERRED EMBODIMENTS

Figure 1:
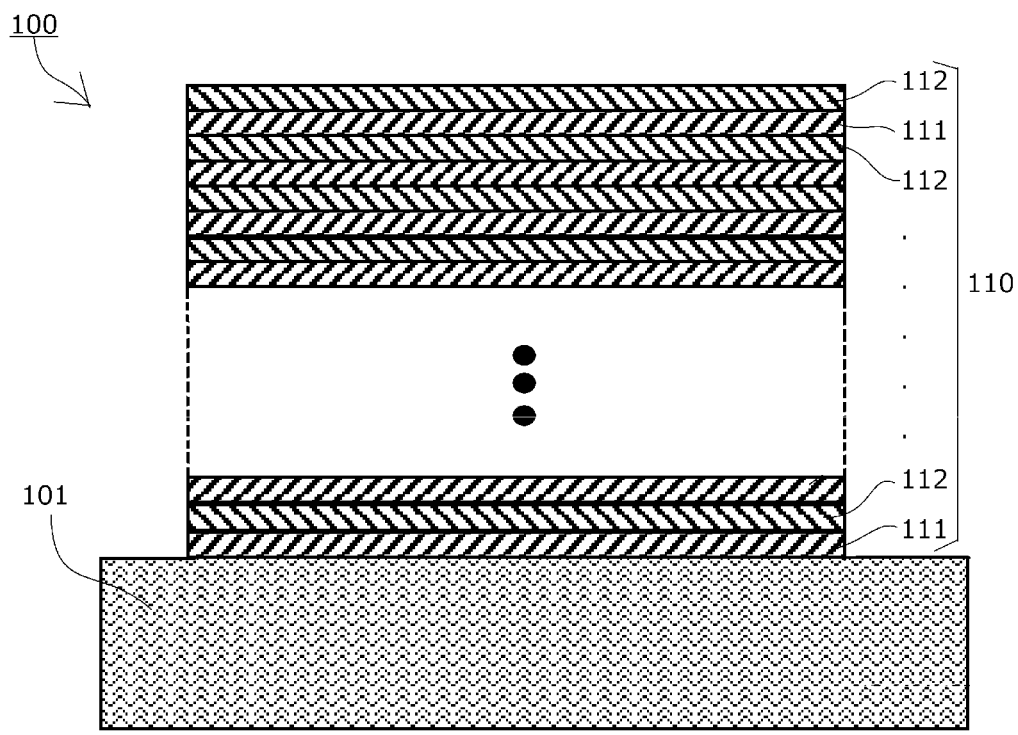
FIG. 1 is a schematically explanatory view of an ultraviolet ray transmissive filter according to the present invention.

An ultraviolet ray transmissive filter 100 that is one embodiment of the present invention will be described based on the figures.

The ultraviolet ray transmissive filter 100 is configured by forming a multilayer optical interference film 110 such that hafnium oxide or HfO$_2$ layers 111 and silicon dioxide or SiO$_2$ layers 112 are alternately laminated, on a substrate 101 that is made from quartz.

Each layer of the optical interference film 110 is formed by any of a sputtering method, vacuum evaporation and ion-assisted deposition.

It is known that a hafnium oxide layer is formed in an amorphous state or in an amorphous state and a crystalline state coexisting according to the forming method, and transmissive properties thereof are superior in the crystalline state. Thus, annealing treatment is carried out by heat treatment or electromagnetism to improve the transmissive properties.

Conventionally, there have been no findings or problems about improvement of light resistance according to difference in the crystal structure, that is, difference in the proportion of the orthorhombic crystal structure, the tetragonal crystal structure, the monoclinic crystal structure, etc. Annealing treatment has been carried out just for the purpose of improving transmissive properties by crystallization without any intention of controlling the crystal structure.

In contrast, in the present invention, annealing treatment is controlled by heat treatment or electromagnetism, to control the proportion of the orthorhombic crystal structure, the tetragonal crystal structure, the monoclinic crystal structure, etc. in the crystal structure of the hafnium oxide layer.

In this Embodiment, the proportion of the orthorhombic crystal structure, the tetragonal crystal structure, the monoclinic crystal structure, etc. in the crystal structure of the hafnium oxide layer is controlled so that the spectral peak intensities $I_b$ from X-ray diffraction which are derived from the orthorhombic crystal structure and the tetragonal crystal structure are lower than the spectral peak intensity $I_a$ from X-ray diffraction which is derived from the monoclinic crystal structure thereof, using the spectral distribution from X-ray diffraction as an index.

More preferably, the spectral peak intensities $I_b$ from X-ray diffraction which are derived from the orthorhombic crystal structure and the tetragonal crystal structure are controlled so as to be 1/10 or less of the spectral peak intensity $I_a$ from X-ray diffraction which is derived from the monoclinic crystal structure.

Figure 2:
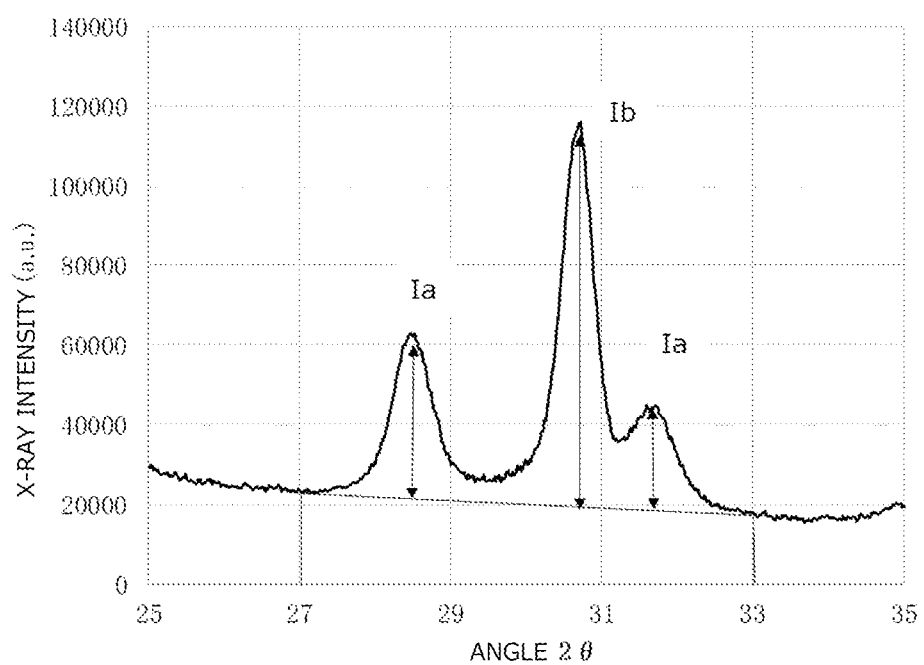
FIG. 2 is a graph of spectral distribution from X-ray diffraction on a conventional ultraviolet ray transmissive filter.

A shown in FIG. 2, the spectral peak intensity $I_b$ of a hafnium oxide layer of a conventional ultraviolet ray transmissive filter which is derived from the orthorhombic crystal structure or the tetragonal crystal structure and are represented by a signal when 2θ is nearly 30.7 of approximately 90000 is higher than the spectral peak intensities $I_a$ thereof which are derived from the monoclinic crystal structure and are represented by a signal when 2θ is nearly 28.5 of approximately 40000 and a signal when 2θ is nearly 31.6 of 20000:60000 in total.

Figure 3:
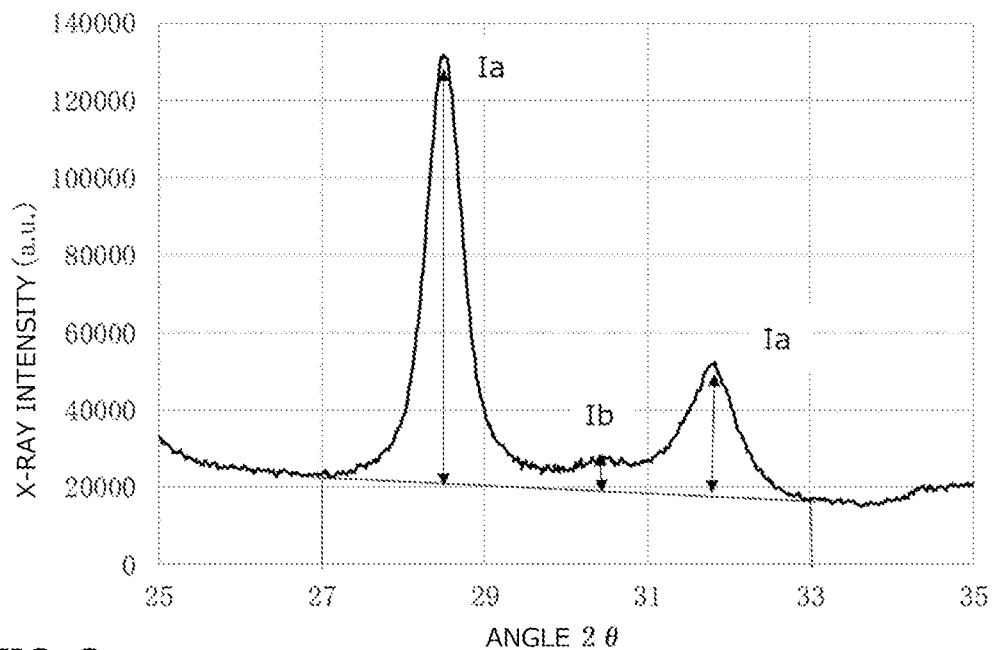
FIG. 3 is a graph of spectral distribution from X-ray diffraction on the ultraviolet ray transmissive filter according to the present invention.

In contrast, as shown in FIG. 3, the spectral peak intensity $I_b$ of the hafnium oxide layer 111 of the ultraviolet ray transmissive filter 100 of this Embodiment which is derived from the orthorhombic crystal structure or the tetragonal crystal structure and is represented by a signal when 2θ is nearly 30.7 of approximately 5000 is lower than the spectral peak intensities $I_a$ thereof which are derived from the monoclinic crystal structure and are represented by a signal when 2θ is nearly 28.5 of approximately 110000 and a signal when 2θ is nearly 31.6 of 30000:140000 in total.

The intensities $I_a$ and $I_b$ of the spectral peaks may be obtained as follows: for example, as shown in FIG. 2, the peak intensities $I_a$ and $I_b$ are represented by the heights of the peaks from the base line calculated from the X-ray diffraction spectrum; this base line is obtained from values at 27.0° and 33°; and based on this, the peak intensities $I_a$ appearing in the range of 2θ=28.5±0.5° and 31.6±0.6° and the peak intensity $I_b$ appearing in the range of 2θ=30.4±0.5° can be determined. The peak intensities $I_a$ and $I_b$ may be obtained as described above.

Figure 4:
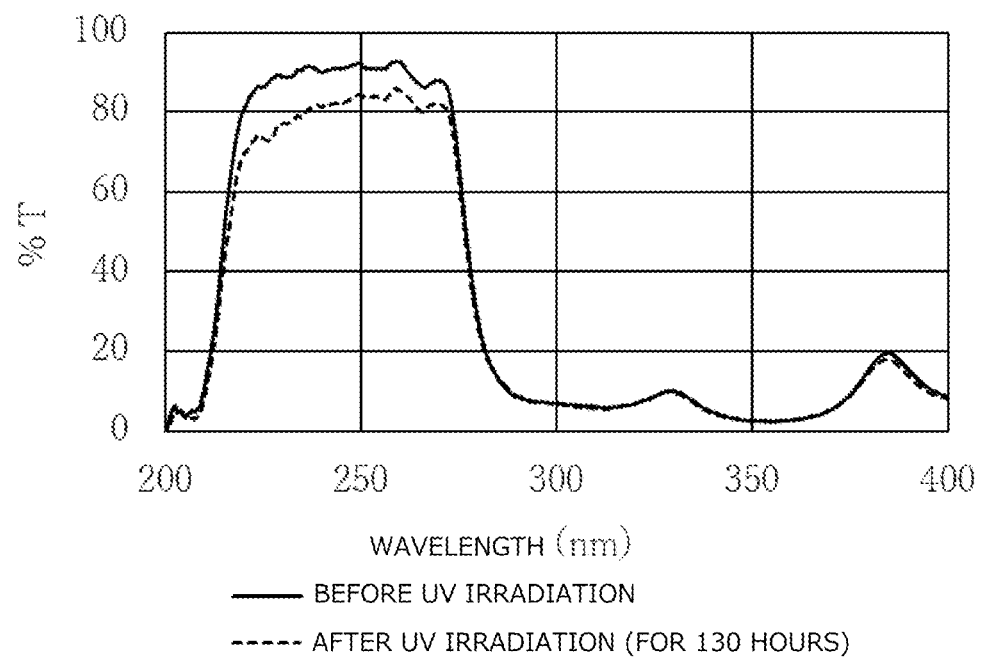
FIG. 4 is a property graph of a conventional ultraviolet ray transmissive filter.

As shown in FIG. 4, the transmittance of a hafnium oxide layer of a conventional ultraviolet ray transmissive filter in the transmission wavelength range of 220 to 270 nm lowers from 90% before UV irradiation to 80% after 130-hour UV irradiation.

Figure 5:
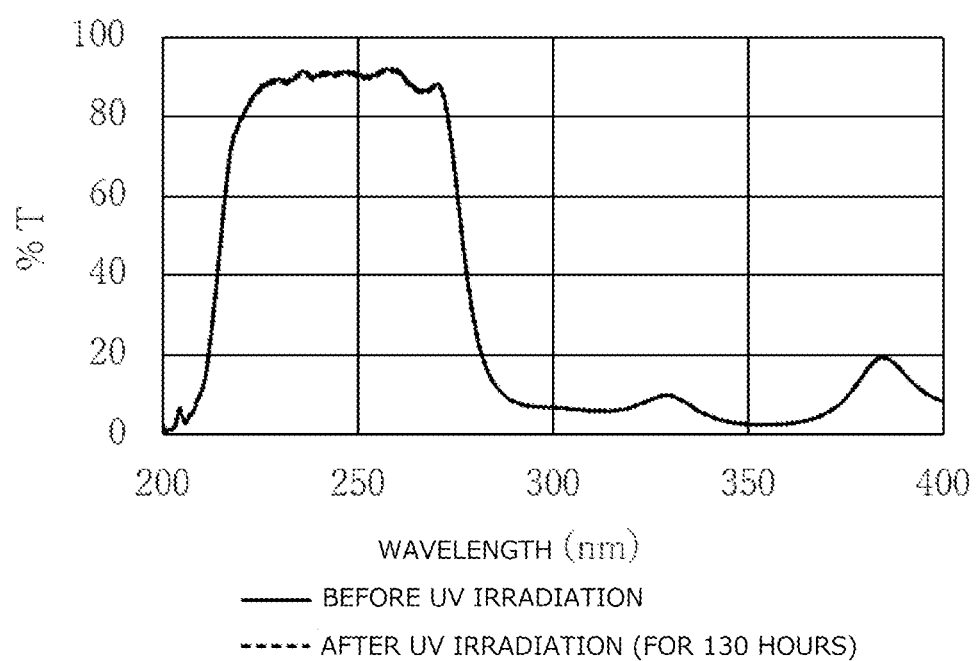
FIG. 5 is a property graph of the ultraviolet ray transmissive filter according to the present invention.

In contrast, as shown in FIG. 5, the transmittance of the hafnium oxide layer 111 of the ultraviolet ray transmissive filter 100 of this Embodiment in the transmission wavelength range of 220 to 270 nm scarcely lowers after 130-hour UV irradiation from 90% before UV irradiation.

From the above, it is found that control on a crystal structure of a hafnium oxide layer by annealing treatment by heat treatment or electromagnetism makes it possible to improve light resistance to ultraviolet rays and suppressing reduction of the transmissivity in a transmission band of an optical interference film even under long-term irradiation with ultraviolet rays as good light blocking properties in a blocking wavelength range are maintained.

The substrate 101 is not limited to quartz, and for example, may be glass, colored glass, crystal and transparent resin. The substrate 101 may be material that gives itself characteristics of absorbing light of a specific wavelength, such as transparent resin to which a coloring matter absorbing light of a predetermined wavelength is added.

The optical interference film 110 may be such that a layer other than the silicon dioxide layer is laminated as long as including the hafnium oxide layer. The optical interference film 110 may be such that at least three different layers in material are laminated.

For example, in addition to the hafnium oxide or HfO$_2$ layer, any layer of Al$_2$O$_3$, ZrO$_2$, LaF$_3$, GdF$_3$, etc. as a high refractive index film may be present, and any layer of SiO$_2$, Al$_2$O$_3$, MgF$_2$, etc. as a low refractive index film may be present.

The ultraviolet ray transmissive filter according to the present invention is applicable to various fields such as the fields of emitting devices, imaging devices, measuring devices, and communication devices.

What is claimed is:

1. An ultraviolet ray transmissive filter having a multilayer optical interference film in which layers having different refractive indexes are alternately laminated, wherein
   the optical interference film includes at least a hafnium oxide layer, and
   in a crystal structure of the hafnium oxide layer, spectral peak intensities $I_b$ from X-ray diffraction which are derived from an orthorhombic crystal structure and a tetragonal crystal structure are lower than a spectral peak intensity $I_a$ from X-ray diffraction which is derived from a monoclinic crystal structure.

2. The ultraviolet ray transmissive filter according to claim 1, wherein
   the spectral peak intensities $I_b$ from X-ray diffraction which are derived from the orthorhombic crystal structure and the tetragonal crystal structure are 1/10 or less of the spectral peak intensity $I_a$ from X-ray diffraction which is derived from the monoclinic crystal structure.

3. The ultraviolet ray transmissive filter according to claim 1, wherein
   the optical interference film is a film in which the hafnium oxide layer and a silicon dioxide layer are alternately laminated.

4. A method for producing an ultraviolet ray transmissive filter having a multilayer optical interference film in which layers having different refractive indexes are alternately laminated, wherein the optical interference film includes at least a hafnium oxide layer, the method comprising:

controlling a crystal structure of the hafnium oxide layer by annealing treatment by heat treatment or electromagnetism;

forming the optical interference film by any of a sputtering method, vacuum evaporation and ion-assisted deposition; and implementing control such that spectral peak intensities $I_b$ from X-ray diffraction which are derived from an orthorhombic crystal structure and a tetragonal crystal structure of the hafnium oxide layer are lower than a spectral peak intensity $I_a$ from X-ray diffraction which is derived from a monoclinic crystal structure thereof.

5. A method for producing an ultraviolet ray transmissive filter having a multilayer optical interference film in which layers having different refractive indexes are alternately laminated, wherein the optical interference film includes at least a hafnium oxide layer, the method comprising:

controlling a crystal structure of the hafnium oxide layer by annealing treatment by heat treatment or electromagnetism;

forming the optical interference film by any of a sputtering method, vacuum evaporation and ion-assisted deposition; and implementing control such that spectral peak intensities $I_b$ from X-ray diffraction which are derived from an orthorhombic crystal structure and a tetragonal crystal structure of the hafnium oxide layer are $1/10$ or less of a spectral peak intensity $I_a$ from X-ray diffraction which is derived from a monoclinic crystal structure thereof.

\* \* \* \* \*